(12) United States Patent
Hovestadt et al.

(10) Patent No.: US 8,328,489 B2
(45) Date of Patent: Dec. 11, 2012

(54) SELF-PIERCE RIVETS AND AN ADJUSTABLE STRAP HANDLE

(75) Inventors: Adrian Hovestadt, Brantford (CA); Robert Francis McPherson, Fergus (CA)

(73) Assignee: Acument Intellectual Properties, LLC, Troy, MI (US)

( * ) Notice: Subject to any disclaimer, the term of this patent is extended or adjusted under 35 U.S.C. 154(b) by 173 days.

(21) Appl. No.: 12/330,058

(22) Filed: Dec. 8, 2008

(65) Prior Publication Data

US 2009/0152334 A1 Jun. 18, 2009

Related U.S. Application Data

(60) Provisional application No. 61/014,238, filed on Dec. 17, 2007.

(51) Int. Cl.
*F16B 19/08* (2006.01)

(52) U.S. Cl. ......... 411/501; 411/487; 411/506; 411/510

(58) Field of Classification Search .............. 411/482, 411/485, 506, 505, 176, 501, 179, 180–181, 411/183, 487, 503, 508–510; 403/278
See application file for complete search history.

(56) References Cited

U.S. PATENT DOCUMENTS

| | | | | |
|---|---|---|---|---|
| 1,504,170 A * | 8/1924 | Weins | ........................... | 181/178 |
| 2,465,534 A * | 3/1949 | Havener | ........................... | 29/464 |
| 4,039,099 A * | 8/1977 | Boxall | ........................... | 220/773 |
| 4,146,118 A * | 3/1979 | Zankl | ........................... | 188/250 G |
| 4,459,073 A * | 7/1984 | Muller | ........................... | 411/176 |
| 5,672,178 A * | 9/1997 | Petersen | ........................... | 606/75 |
| 5,733,086 A * | 3/1998 | Jakob | ........................... | 411/501 |
| 5,755,545 A * | 5/1998 | Banks | ........................... | 411/482 |
| 6,023,891 A * | 2/2000 | Robertson et al. | ........... | 52/125.4 |
| 6,325,584 B1 * | 12/2001 | Marko et al. | ................... | 411/501 |
| 6,607,340 B2 * | 8/2003 | Petzl et al. | ........................... | 411/400 |
| 6,668,501 B2 * | 12/2003 | Adebar et al. | ................... | 52/363 |
| 6,994,486 B1 * | 2/2006 | Babej | ........................... | 403/274 |
| 7,131,807 B1 * | 11/2006 | Babej | ........................... | 411/181 |
| 7,160,047 B2 * | 1/2007 | Mueller et al. | ................ | 403/283 |
| 7,287,944 B2 * | 10/2007 | Ladouceur | ........................ | 411/107 |
| 7,425,111 B2 * | 9/2008 | Ladouceur | ........................ | 411/181 |
| 7,731,467 B2 * | 6/2010 | Babej | ........................... | 411/501 |
| 2001/0048859 A1* | 12/2001 | Shinjo | ........................... | 411/107 |
| 2004/0096296 A1* | 5/2004 | Stevenson et al. | ............. | 411/501 |
| 2006/0124568 A1 | 6/2006 | de Alba | | |
| 2006/0131371 A1 | 6/2006 | de Alba | | |

* cited by examiner

*Primary Examiner* — Roberta Delisle
(74) *Attorney, Agent, or Firm* — Clark Hill PLC

(57) ABSTRACT

An adjustable strap handle that can be used in connection with a packaging frame. The strap handle provides not only that the effective length of the strap is adjustable, but also provides that no tool needs to be used to install the strap. Additionally, a dual head self-pierce rivet is described that can be used in connection with a packaging frame, specifically to secure cardboard edge pieces to thin sheet metal or cardboard corner pieces and provide structure with which strap handles can engage. The dual head self-pierce rivet has a shank and a poke at its end. The poke is configured to pierce through the cardboard edge pieces of a cube frame, advance into the edge pieces, and flare into a profiled anvil. While a lower head of the rivet seats against the cardboard, an upper head contains and holds a strap handle in a ring groove.

5 Claims, 4 Drawing Sheets

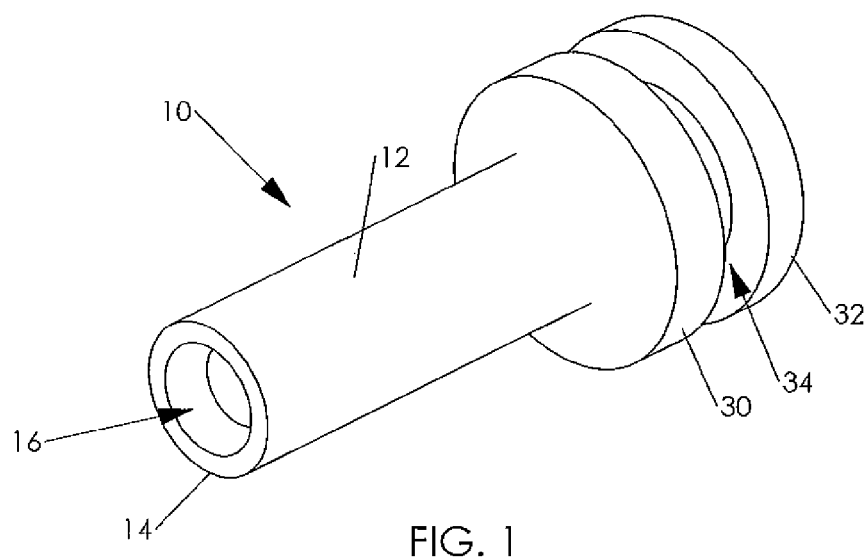
FIG. 1
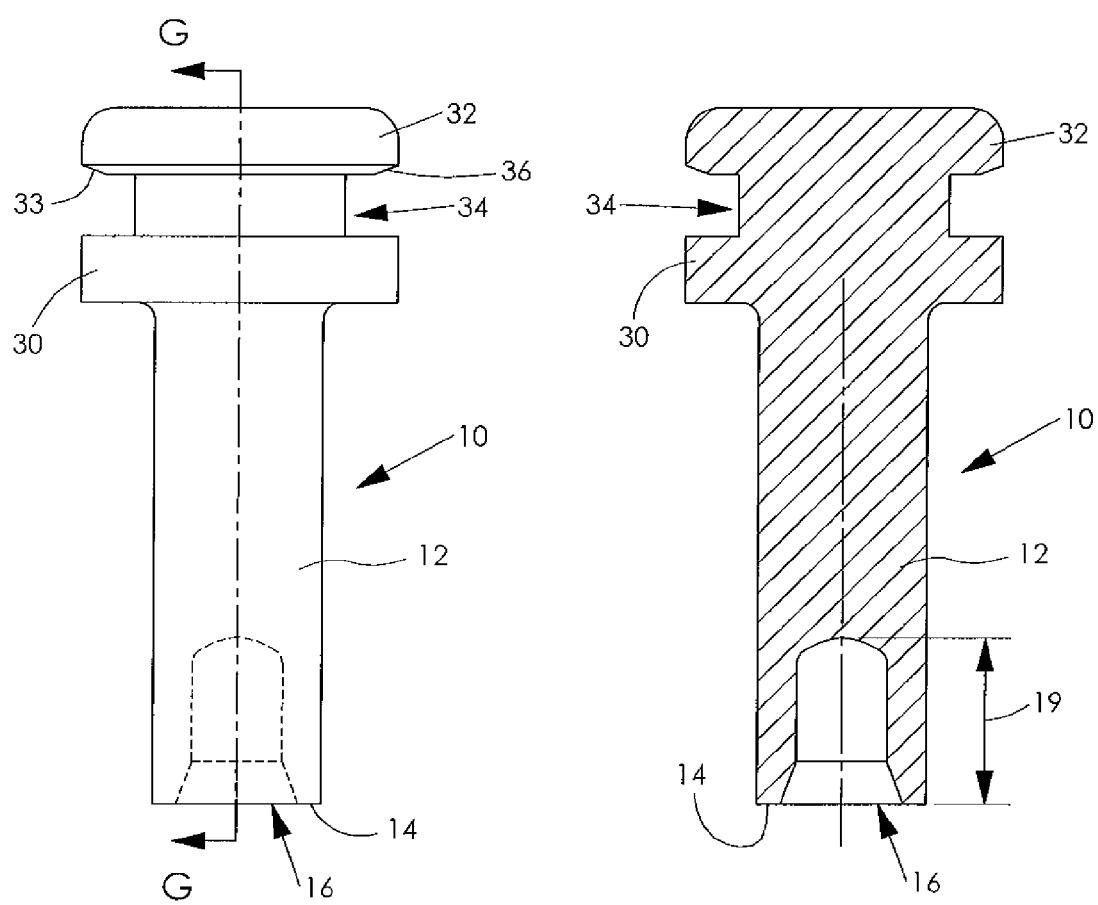
FIG. 2
FIG. 3

SELF-PIERCE RIVETS AND AN ADJUSTABLE STRAP HANDLE

RELATED CLAIM (PRIORITY CLAIM)

This application claims the benefit of U.S. Provisional Application Ser. No. 61/014,238, filed Dec. 17, 2007, which is hereby incorporated herein by reference in its entirety.

BACKGROUND

The present disclosure generally relates to self-piercing rivets as well as to strap systems which are used in packaging.

Cardboard cube frames are sometimes used to package items in a way that they can be readily exhibited at the point of sale. One such cardboard cube frame is disclosed in U.S. Patent Publication No. 2006/0131371 A1. The frame consists of a plurality of edge pieces which are held together by fixating devices. A plastic film is then wrapped around the frame to help secure the product in the frame. The film is kept in place while the package is transported, but then is removed at the point of sale for product exhibition.

Instead of using plastic film, fixed-length straps are sometimes used. In such a case, there is a strap handle provided at each end of the strap, and each strap handle is engaged with a fastener which is secured to the outside of the frame. The manufacturing tolerances of the frame often cause a fixed length strap to be loose when installed. If the fixed length strap is not too loose, then a tool is typically required to stretch the strap handle over the fastener.

To provide enhanced stability to the frame, thin sheet metal or cardboard corner pieces may be used within the corners of the frame. In such a case, the relatively thick cardboard edge pieces must be fastened to the corner pieces somehow. This is typically done by drilling holes through the cardboard edge pieces and the corner pieces, and then installing fasteners in the holes. This process is time-consuming and difficult to perform in an automated process.

OBJECTS AND SUMMARY

An object of an embodiment of the present invention is to provide an improved strap handle.

An object of another embodiment of the present invention is to provide a self-pierce rivet, whether it have a single head or a dual head.

Briefly, one embodiment of the present invention provides an adjustable strap handle that can be used in connection with a packaging frame. The strap handle provides not only that the effective length of the strap is adjustable, but also provides that no tool needs to be used to install the strap.

Briefly, another embodiment of the present invention provides a dual head self-pierce rivet that can be used in connection with a packaging frame, specifically to secure cardboard edge pieces to thin sheet metal or cardboard corner pieces and provide structure with which strap handles can engage. The dual head self-pierce rivet has a shank and a poke at its end. The poke of the dual head self-pierce rivet is configured to pierce through one piece of material (such as cardboard edge pieces of a cube frame), advance into another piece of material (such as sheet metal or cardboard edge pieces of a cube frame), and flare into a profiled anvil. While a lower head of the rivet seats against the cardboard, thereby controlling the depth the rivet will be set, an upper head contains and holds a strap handle in a ring groove which is disposed between the upper and lower head of the rivet.

BRIEF DESCRIPTION OF THE DRAWINGS

The organization and manner of the structure and operation of the invention, together with further objects and advantages thereof, may best be understood by reference to the following description, taken in connection with the accompanying drawing, wherein:

FIG. 1 is a perspective view of a dual head self-pierce rivet which is in accordance with an embodiment of the present invention;

FIG. 2 is a side view of the dual head self-pierce rivet;

FIG. 3 is a cross-sectional view of the dual head self-pierce rivet, taken along line G-G of FIG. 2;

DESCRIPTION

Figure 4:
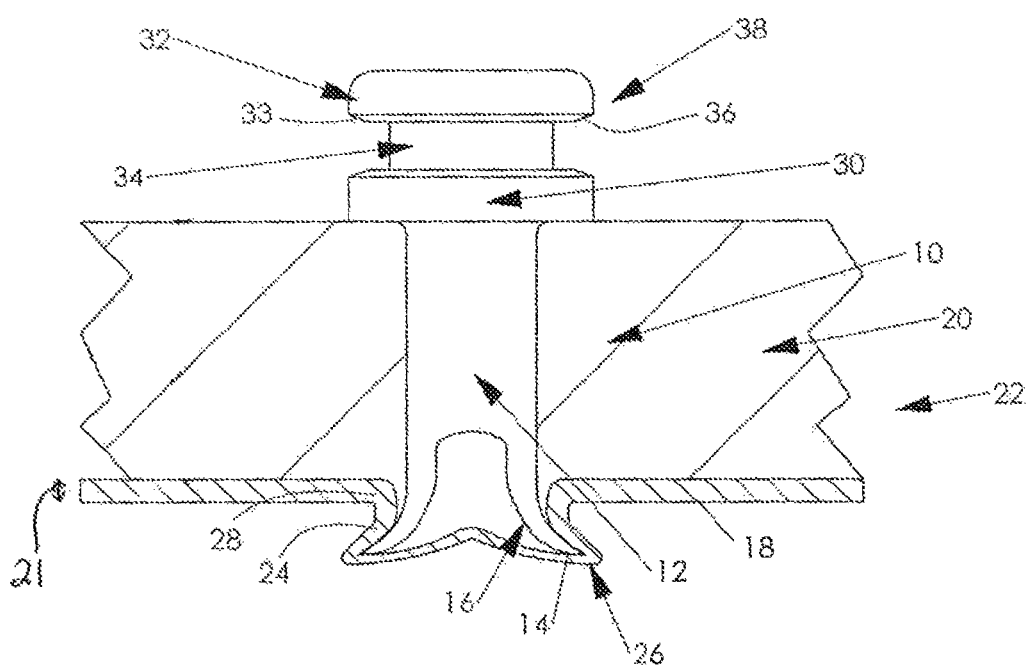
FIG. 4 is a cross-sectional view which shows the dual head self-pierce rivet installed, relative to a cardboard edge piece and a sheet metal corner piece of a cube frame.

While the invention may be susceptible to embodiment in different forms, there are shown in the drawings, and herein will be described in detail, specific embodiments of the invention. The present disclosure is to be considered an example of the principles of the invention, and is not intended to limit the invention to that which is illustrated and described herein.

FIGS. 1-4 illustrate a dual head self-pierce rivet 10 which is in accordance with an embodiment of the present invention, and which can be used in connection with a packaging frame, such as a cube frame to secure cardboard edge pieces to thin sheet metal or cardboard corner pieces and provide structure with which strap handles can engage.

The dual head self-pierce rivet 10 has a shank portion 12, and at the end 14 of the shank portion 12 is a self-pierce poke 16. While a majority of the shank portion 12 is not hollow, the poke portion 16 is, thereby providing that the rivet 10 is semi-tubular by virtue of the poke 16. The poke 16 is preferably at least as deep as the sheet metal 18 is thick (see FIG. 4) (i.e., dimension 19 in FIG. 3 is at least as big as dimension 21 in FIG. 4) at the location at which the rivet 10 is to be installed. The poke 16 of the rivet 10 is of sufficient strength and thickness such that it can pierce the sheet metal 18. As shown in FIG. 4, the poke 16 of the dual head self-pierce rivet 10 is configured to pierce through one piece of material 20 (such as cardboard edge pieces of a cube frame 22), advance into another piece of material 18 (such as sheet metal or cardboard edge pieces of a cube frame), and flare into a profiled anvil 24 within the metal 18, thereby creating a button 26. The flare of the poke 16 compresses the cardboard 20 and provides an undercut 28, thereby strengthening the joint in terms of shear and tensile. During installation, the poke 16 pierces into the sheet metal 18, collapses and effectively clamps to the sheet metal 18. The clamping force ensures a very strong holding force between the rivet 10 and the sheet metal 18. The rivet 10 remains straight or at a right angle to the metal 18 even though the cardboard 20 may fail. The rivet 10 may be formed of steel, such as 1008, 1018, 1047 or 1037 steel.

The dual head self-pierce rivet 10 includes a lower head 30 which is configured to seat against the cardboard 20, thereby controlling the depth the rivet 10 will be set, and includes an upper head 32. The upper head 32 contains and holds a strap handle 40 in a ring groove 34 which is disposed between the upper head 32 and lower head 30 of the rivet 10. The upper head 32 offers guidance and clearance to slide a strap handle over the rivet 10. A lower surface 33 of the upper head 30 provides a chamfer 36 which is configured to lead the strap handle into the ring groove 34 without getting caught on any edges. The fact that the lower head 30 seats against the cardboard 20 tends to provide stability to the joint that is formed and reduce the bending moment with regard to an upper portion 38 of the rivet 10, where the upper portion 38 consists of the ring groove 34 and the upper head 32 of the rivet 10.

While the rivet 10 has mainly been described with regard to flaring into a thin sheet metal edge piece 18, the rivet 10 may also be used in connection with a cube frame which uses edge pieces made out of cardboard. As such, reference numeral 18 may refer to cardboard instead of sheet metal, or any other appropriate material.

Figure 6:
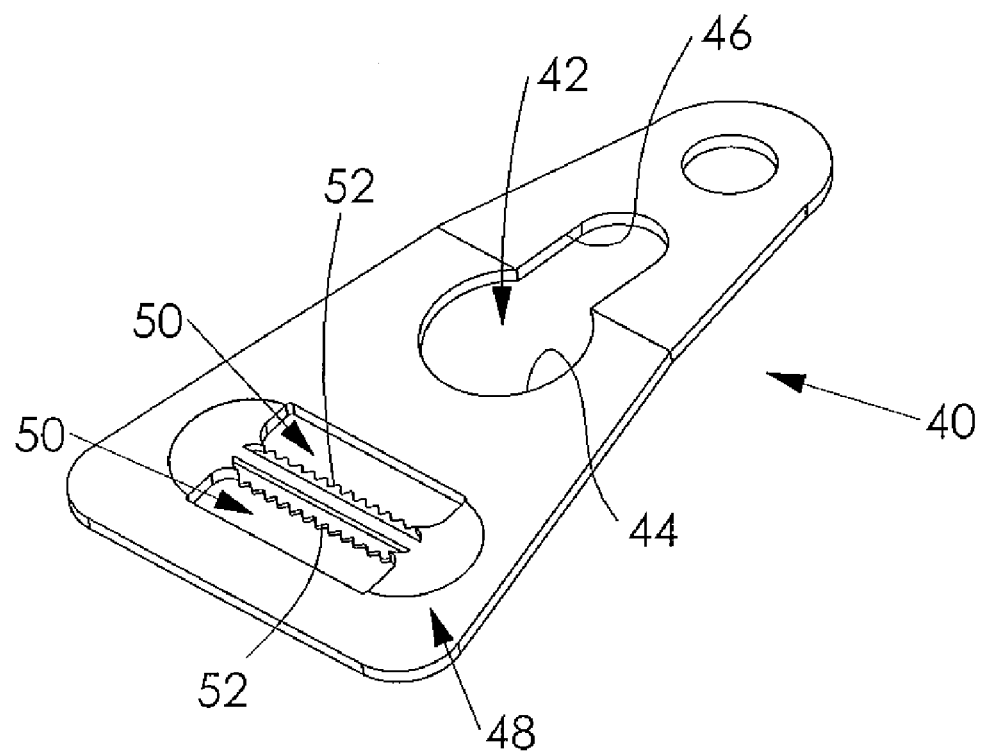
FIG. 6 is a perspective view of a strap handle which is in accordance with yet another embodiment of the present invention.
Figure 7:
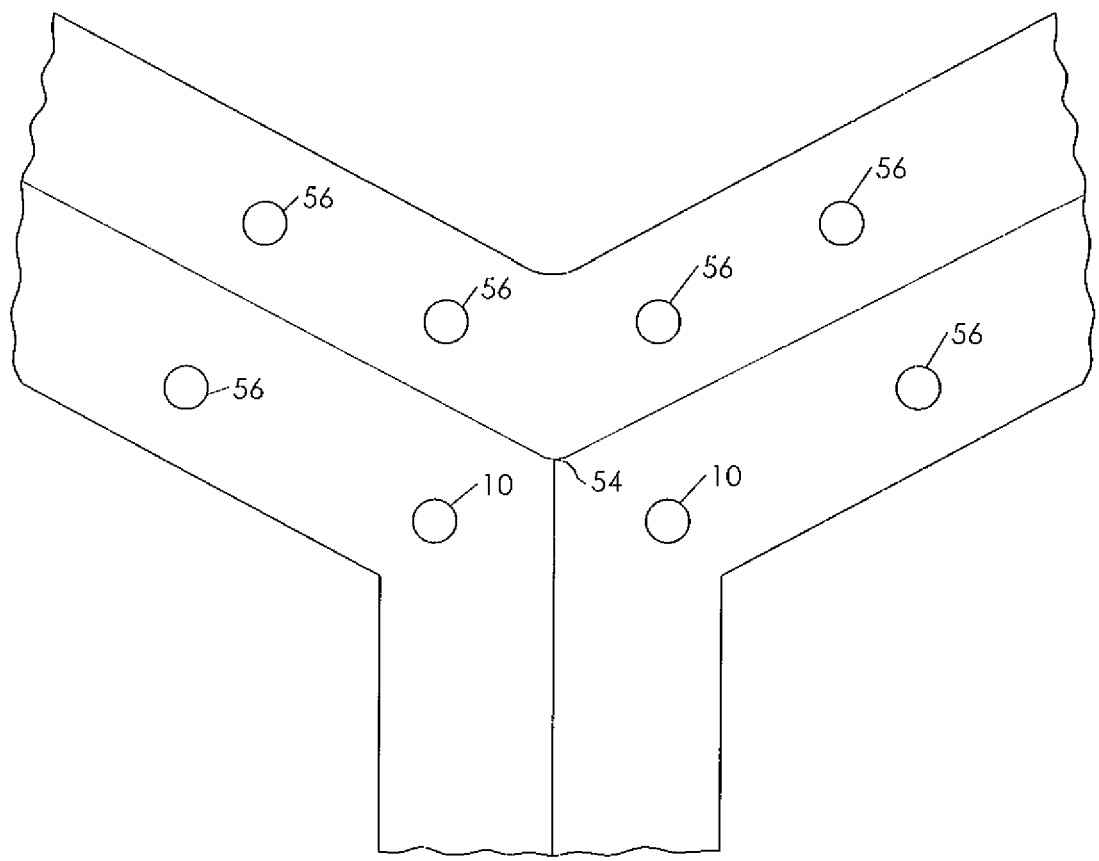
FIG. 7 shows the corner of a cube frame, where both the dual head self-pierce rivet (of FIGS. 1-4) and the single head self-pierce rivet (of FIG. 5) are being used.

While a conventional strap handle can be used in association with the dual head self-pierce rivet 10 shown in FIGS. 1-4, preferably a strap handle 40 such as shown in FIG. 6 is used, where the strap handle 40 is in accordance with another embodiment of the present invention. As shown, the strap handle 40 includes a strap groove 42 which is configured to receive the upper portion 38 of the dual head self-pierce rivet 10. Specifically, the strap groove 42 provides an enlarged opening 44 into which the upper head 32 of the rivet 10 can be inserted, after which the strap can be tightened causing the ring groove 34 of the rivet 10 to slide into a slot area 46 of the strap groove 42, thereby securing the strap handle 40 to the rivet 10. The strap handle 40 also includes a strap guide 48 which is configured to receive a strap. Specifically, the strap guide 48 preferably includes two parallel openings 50 for receiving the strap and preferably includes teeth 52 for gripping the strap. The strap handle 40 provides not only that the effective length of the strap is adjustable, but also provides that no tool needs to be used to install the strap relative to, for example, two dual head self-pierce rivets (i.e., one at each end of the strap).

Figure 5:
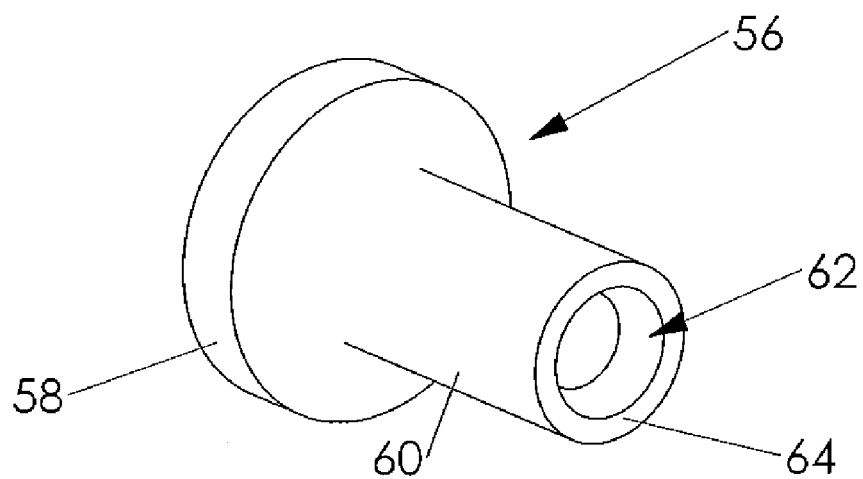
FIG. 5 is a perspective view of a single head self-pierce rivet which is in accordance with another embodiment of the present invention.

As shown in FIG. 6, preferably dual head self-pierce rivets 10 are installed on a cube frame 22 near the corners, i.e., wherever it is desired to attach a strap. Additionally, single head self-pierce rivets 56 in accordance with another embodiment of the present invention can be used at other locations of the cube frame 22, thereby further securing the metal corner pieces 18 to the cardboard edge pieces 20 of the cube frame 22. As shown in FIG. 5, the single head self-pierce rivet 56 is very much like the dual head self-pierce rivet 10 described hereinabove, except the single head self-pierce rivet 56 does not include the upper head 32 and the ring groove 34. However, the single head self-pierce rivet 56 still includes a head 58, and the head 58 seats against the cardboard 20 much like the lower head 30 of the dual head self-pierce rivet 10 does when installed. The single head self-pierce rivet 56 also includes a shank portion 60 having a poke 62 at its end 64 much like the dual head self-pierce rivet 10, and installs in the same fashion forming a button in the metal 18 and providing a strengthened joint. Both of the rivets described hereinabove are configured such that they can be installed very quickly using automation equipment.

While embodiments of the present invention are shown and described, it is envisioned that those skilled in the art may devise various modifications of the present invention without departing from the spirit and scope of the disclosure.

What is claimed is:

1. An assembly comprising:
a first piece of material having a substantially planar first surface and a second surface;
a second piece of material having first and second surfaces, said first surface of said second piece of material being seated against said second surface of said first piece of material;
a rivet comprising a lower head, an upper head and a ring groove which is disposed between said upper head and said lower head, said lower head being seated against said first substantially planar surface of said first piece of material said rivet further comprising a shank which extends outwardly from said lower head to a free end thereof, said shank having a poke at said free end which is hollow, said shank being positioned through said first piece of material, said poke being at least partially flared and defining an undercut of said first piece of material and a button in said second piece of material, said second piece of material being unpierced by said shank; and
a strap handle which is positioned around said ring groove and held in place by said upper head of said rivet,
wherein said first piece of material and said second piece of material are fixedly secured to one another by said rivet, and wherein said rivet and said second piece of material are fixedly secured to one another.

2. The assembly as defined in claim 1, wherein a lower surface of said upper head provides a chamfer which is configured to lead said strap handle into said ring groove.

3. The assembly as defined in claim 1, wherein said poke has a length which is less than half of a length of said shank.

4. The assembly as defined in claim 1, wherein said poke has a length which is at least as large as a thickness of said second piece of material.

5. The assembly as defined in claim 1, wherein said first piece of material is formed of cardboard and wherein said second piece of material is formed of sheet metal.

* * * * *